July 19, 1949.  E. O. HENDERSON  2,476,491
REFRIGERATING APPARATUS

Filed Aug. 29, 1945  6 Sheets-Sheet 1

E. O. Henderson
INVENTOR.

BY
ATTORNEYS.

July 19, 1949.   E. O. HENDERSON   2,476,491
REFRIGERATING APPARATUS

Filed Aug. 29, 1945   6 Sheets-Sheet 2

E. O. Henderson
INVENTOR.

BY
ATTORNEYS.

July 19, 1949.  E. O. HENDERSON  2,476,491
REFRIGERATING APPARATUS
Filed Aug. 29, 1945  6 Sheets-Sheet 3
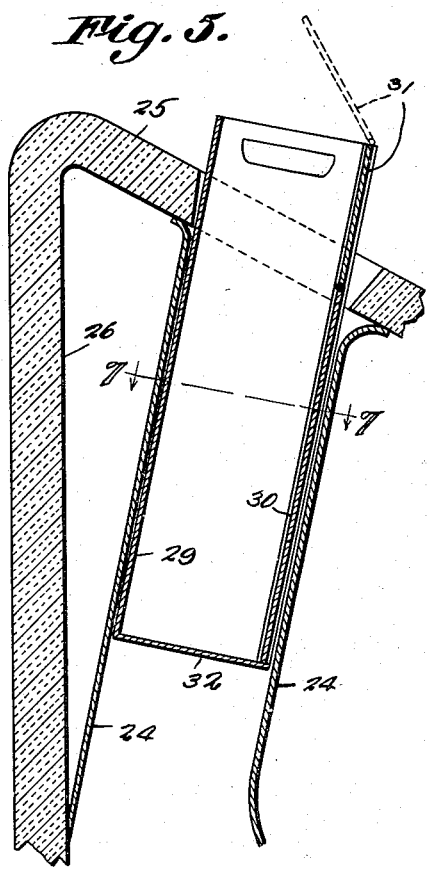
Fig. 5.
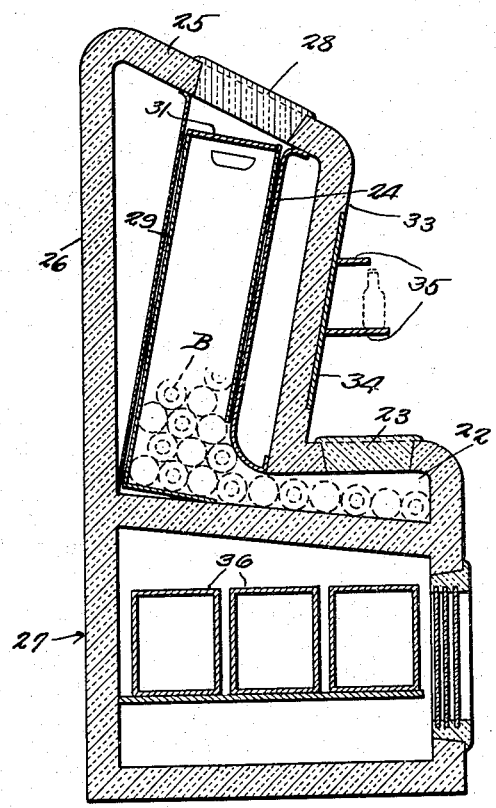
Fig. 4.
Fig. 6.
Fig. 7.
E. O. Henderson
INVENTOR.
BY C. A. Snowles Co.
ATTORNEYS.

July 19, 1949.　　　　E. O. HENDERSON　　　　2,476,491
REFRIGERATING APPARATUS
Filed Aug. 29, 1945　　　　　　　　　　　　6 Sheets-Sheet 4
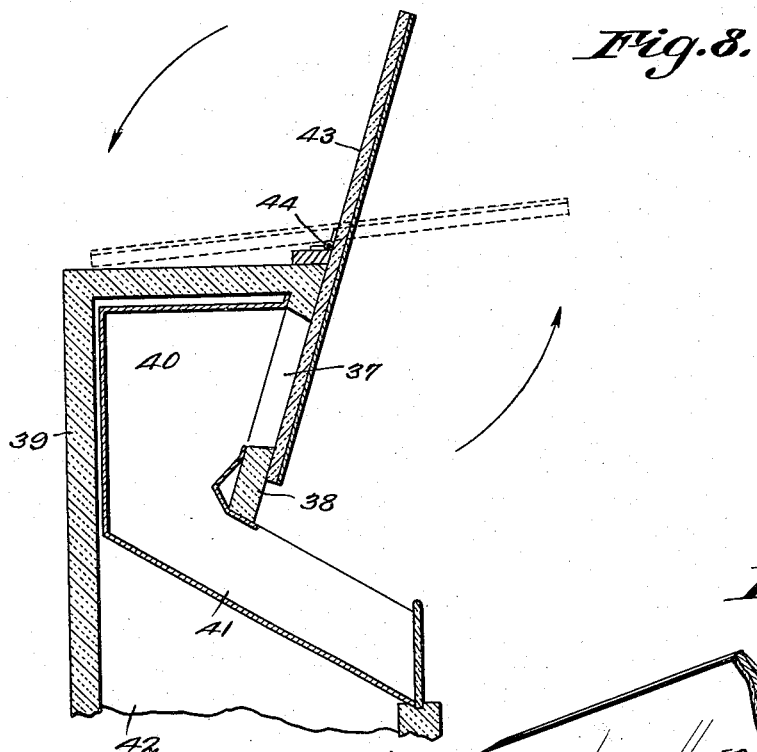
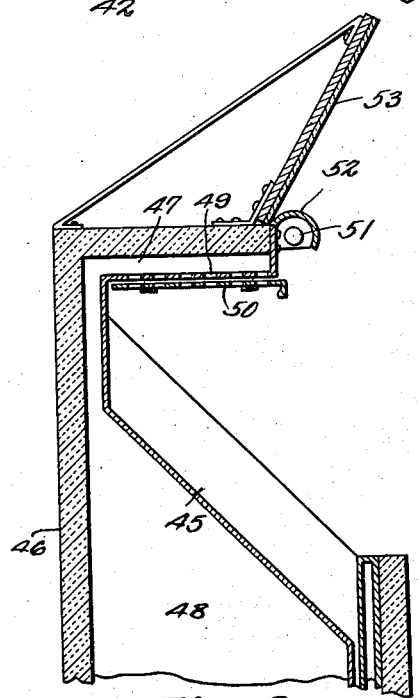
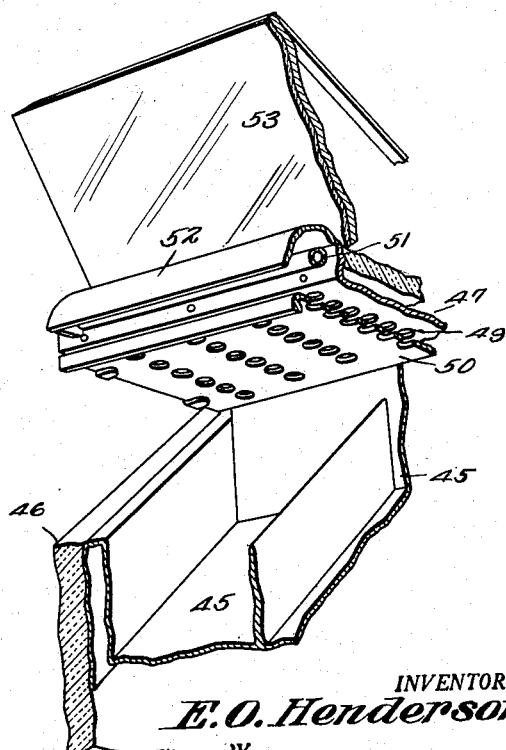
INVENTOR.
E. O. Henderson
BY
ATTORNEYS.

July 19, 1949.　　　　E. O. HENDERSON　　　　2,476,491
REFRIGERATING APPARATUS

Filed Aug. 29, 1945　　　　　　　　　　　　6 Sheets-Sheet 5

E. O. Henderson
INVENTOR.

BY
ATTORNEYS.

July 19, 1949.  E. O. HENDERSON  2,476,491
REFRIGERATING APPARATUS

Filed Aug. 29, 1945  6 Sheets-Sheet 6

E. O. Henderson
INVENTOR.

BY
ATTORNEYS.

Patented July 19, 1949

2,476,491

UNITED STATES PATENT OFFICE 2,476,491

REFRIGERATING APPARATUS

Elden O. Henderson, Springfield, Mo., assignor to Alma Serena Henderson, Oklahoma City, Okla.

Application August 29, 1945, Serial No. 613,289

4 Claims. (Cl. 62—89.5)

This invention relates to refrigerating apparatus and more particularly to a refrigerating case so constructed that vegetables, fruits, beverages, etc., can be displayed at points where they are accessible readily by customers and to which they are fed by gravity so as to maintain a constant supply of merchandise available to the customer as long as the apparatus is properly serviced by the operator.

It is a further object of the invention to utilize trays or troughs to which the merchandise is fed by gravity, all of the merchandise being maintained in a chilled condition both while on display and while in reserve.

Another object is to provide refrigerating apparatus which can be of the step-in type or of the refrigerating show case type and which can be equipped with means by which its appearance will be enhanced greatly through the use of reflecting elements, illuminating devices, etc.

A still further object is to provide a means by which the contents of the apparatus can be shut off from the surrounding atmosphere so as to prevent dissipation of chilled air when the apparatus is not in use. A further object is to provide a new and improved method for maintaining a refrigerated supply of merchandise in an accessible open tray or chamber.

With the foregoing and other objects in view which will appear as the description proceeds, the invention consists of certain novel details of construction and combinations of parts and certain novel steps in the method of refrigeration hereinafter more fully described and pointed out in the claims, it being understood that changes may be made in the construction and arrangement of parts without departing from the spirit of the invention as claimed.

In the accompanying drawings the preferred forms of the invention have been shown.

In said drawings

Figure 4 is a view similar to Fig. 2 showing a modification of the apparatus whereby beverages contained in bottles or the like can be refrigerated and supplied to customers.

Figure 5 is a vertical section through the upper portion of the top of the structure shown in Fig. 4 and illustrating a step to be followed in placing bottles or the like in the refrigerator.

Figure 6 is a front elevation of a portion of a refrigerator shown in Fig. 4.

Figure 7 is a section on line 7—7, Fig. 5.

Figure 8 is a section through the upper portion of another form of refrigerating apparatus, a combined reflector and closure being illustrated by full lines and in broken lines in two different positions.

Figure 9 is a view similar to Fig. 8 showing another modification.

Figure 10 is a perspective view of a portion of the modified structure illustrated in Fig. 9.

Figure 1:
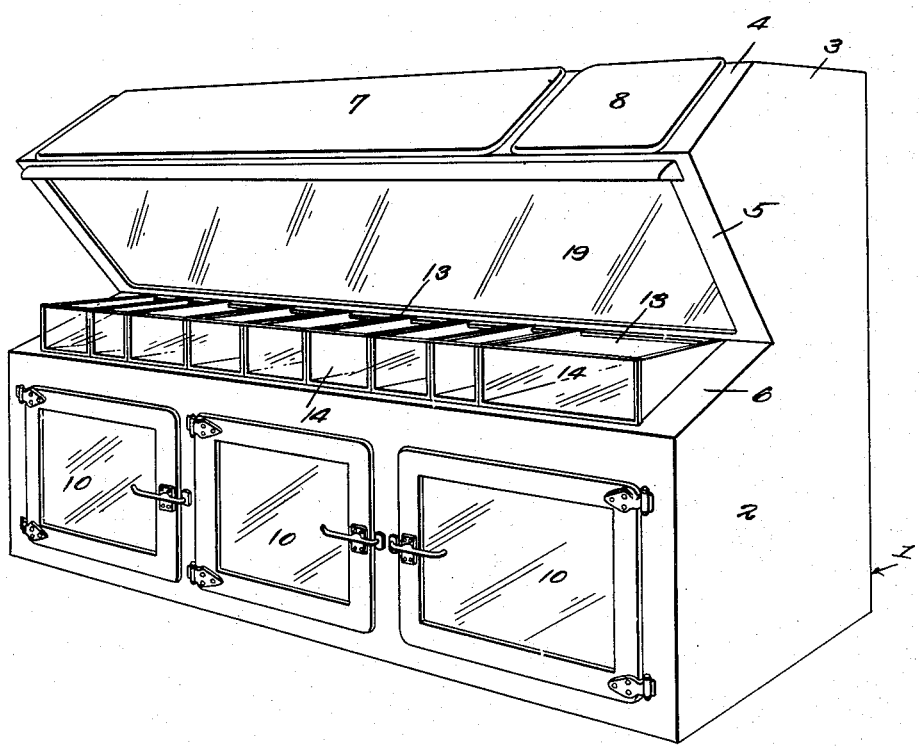
Figure 1 is a perspective view of a refrigerating apparatus embodying the present improvements.

Referring to the figures by characters of reference 1 designates a case which can be of any desired size and proportions. In the structure illustrated in Figs. 1 and 2, the case is of a type to be loaded from the outside and it includes a bottom section 2 and a top section 3. These sections can be made separate or can be integral and the front of the top section has its upper portion inclined downwardly and forwardly as at 4 while the lower portion is inclined downwardly and rearwardly as at 5 and overhangs the projecting top 6 of the lower section 2. It is to be understood, of course that the top of the case as well as its back ends are closed, but the inclined portion 4 of the top can be provided with removable closures 7 and 8 which, when removed, give access to the interior of the apparatus so as to allow the operator to load merchandise into the same.

The lower portion 2 of the case contains the refrigerating means 9 which can be in the form of a mechanical refrigerating unit as shown although, if preferred, the refrigerant could be in the form of ice suitably supported in the lower portion 2. Front doors 10 can be used for giving access to the lower portion 2.

Located within the upper portion 3 of the case 1 are a desired number of downwardly and rearwardly inclined chutes or dispensing containers 11 formed preferably of a material which permits rapid conduction of thermal units. These containers open through the inclined front portion 4 of the case and are adapted to be closed at their upper ends by the closures 7 and/or 8. All of the containers are positioned back of the inclined portion 5 of the case and each container merges at its lower end along downwardly and forwardly curved lines, as indicated at 12, into a tray 13 which is extended forwardly under the inclined portion 5 to a point close to the front of the lower portion 2 of the case. Those portions of these trays or troughs 13 which project beyond the inclined portion 5 are provided with open tops as clearly indicated in Figs. 1 and 2 and, in order that the contents of the different trays or troughs may be inspected readily, it is preferred to form the front walls 14 thereof of glass or other suitable transparent material.

Figure 2:
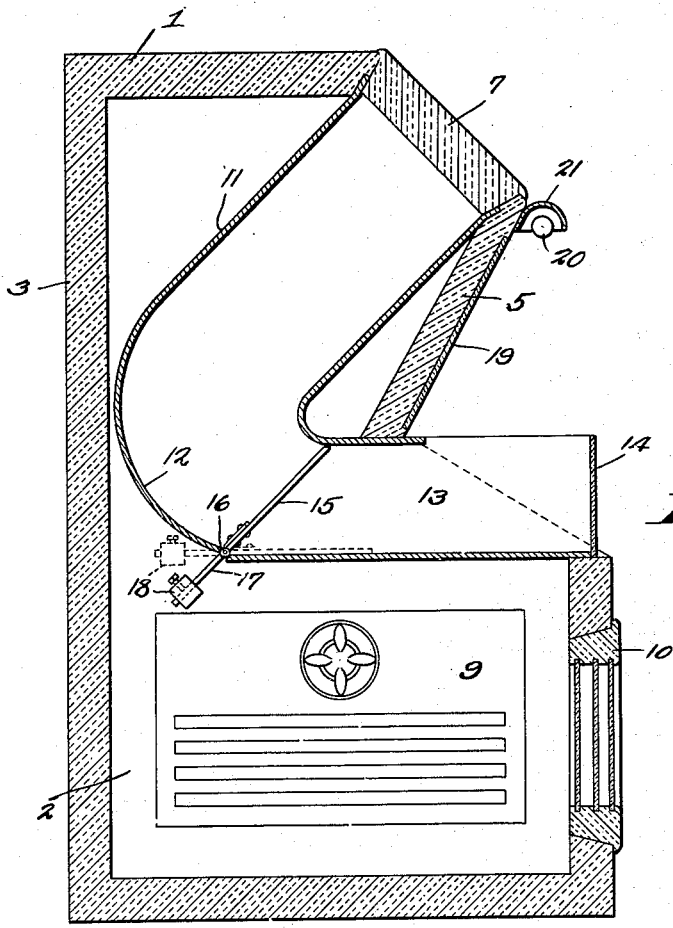
Figure 2 is a vertical section therethrough taken from front to rear.
Figure 3:
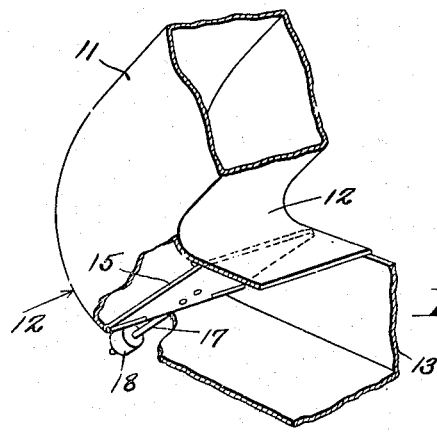
Figure 3 is a perspective view of a portion of one of the chutes or refrigerated dispensing containers showing a counter balanced damper in position, a portion of the container being broken away.

Adjacent to the back end of each trough or tray 13 there is located a damper 15 which is pivotally mounted at its lower end as shown at 16 and provided with an arm 17 extending below the tray or trough. This arm has a counterweight 18 attached thereto and as the height of the damper is somewhat greater than the distance between the top and bottom of the tray or trough in which it is located the counter balanced damper normally is pressed against the top of the tray or trough as shown in Figs. 2 and 3. As each damper extends throughout the width of the trough or tray in which it is located, it will be obvious that when the damper is in its closed position it will prevent the escape of cold air upwardly from the tray or trough through the container 11 to the top of the case should one or both of the closures 7 or 8 be removed. These dampers thus retard the rise of temperature in the apparatus when one of the trays or troughs becomes empty. The damper will of course open automatically under the weight of material fed thereagainst by way of a container 11.

It is to be understood of course that the different kinds of merchandise in the form of fruits, vegetables, etc., are to be placed into the upper ends of the different containers 11 after which the containers are closed. The material supplied to the containers will gravitate against and will open the dampers so as thus to be made accessible within the trays or troughs 13. The refrigerating means in the lower portion of the case will maintain the containers 11, the troughs or trays 13, and the contents thereof at a temperature much lower than that of the surrounding atmosphere.

As shown in Figs. 1 and 2, a reflector or mirror 19 can be mounted on the inclined portion 5 and a lamp 20 for illuminating purposes can be supported above this mirror beneath a hook or reflector 21. Thus the attractiveness of the apparatus is enhanced.

Various modifications of the apparatus can be made within the scope of the claims. One of these modifications has been illustrated in Figs. 4 to 7 inclusive, wherein the structure has been adapted for chilling and dispensing bottles or other similar containers. In this modified structure separate troughs or trays 22 are provided with individual top closures 23 and all of them are in communication with chutes or containers 24 extending downwardly from the inclined top 25 of the upper portion 26 of case 27. Closures 28 are provided for the upper ends of the containers and the lower ends of the containers open into the rear ends of the respective trays or troughs 22.

A carton or insert 29 formed of cardboard or the like and filled with a supply of bottles "B," for example, can be provided with a slidable closure 30 one end of which can be formed with a hinged or removable section 31. Normally this slidable panel 30 fits against the bottom 32 of the carton 29, as shown in Fig. 5, and with the carton thus closed and filled with bottles, it is lowered into one of the containers 24 through the opened top of the container. When the bottom end of the carton comes against the lower end of the container the slidable panel 30 is pulled upwardly and the end portion 31 can be removed or can be swung downwardly to close the top of the carton as indicated in Fig. 4. This movement of the panel will release the contained bottles so that the lower ones can gravitate to the tray or trough communicating therewith and they will then be held where they are accessible readily by removing the closure 23 thereabove. Suitable refrigerating means can be located in the lower portion of the case and, consequently, the trays or troughs and chutes will thus be maintained constantly at a low temperature.

The front of the upper portion 26 of the case can overhang the lower portion of the case as shown at 33 and can be provided with a mirror 34 for the purpose of enhancing the appearance of the structure. One or more shelves 35 can also be located on the front portions 33 for supporting bottles to be displayed or for other purposes. The lower portion of the case can also be used for holding supplies in reserve as indicated at 36.

In Fig. 8 the refrigerating apparatus has been shown with a feed opening 37 in the downwardly and backwardly inclined front wall 38 of the upper portion 39 of the case and back of this opening is a dispensing container 40 which can be in the form of a hopper, the bottom of which opens into a downwardly and forwardly inclined tray or trough 41 which projects over the bottom portion 42 of the apparatus and serves to close the top thereof. That portion of the tray or trough extending outwardly from the inclined wall 38 is open at the top.

A mirror 43 is hingedly connected to the top of the case as indicated at 44 and when in normal position closes the opening 37 and overhangs the tray or trough 41. However this mirror can be swung back as indicated by broken lines in Fig. 8 so as to uncover opening 37 and allow merchandise to be placed into the upper portion of the hopper 40.

In Figures 9 and 10 there has been shown a structure in which inclined troughs or trays 45 are exposed within the upper portion of the case 46 and have an overlying air duct or chute 47 in communication with the space 48 beneath the trays or troughs 45. The upper portion of this chute has vents 49 in the bottom thereof through which cold air can escape downwardly onto the contents of the trays or troughs 45 and the escaping of cold air through these vents can be regulated by a slidable apertured damper 50. In this structure an illuminating lamp 51 has been shown beneath a reflector 52 at the front of the top of the case and a mirror 53 has been shown supported in an inclined position over the reflector 52 and the trays or troughs 45.

Figure 11:
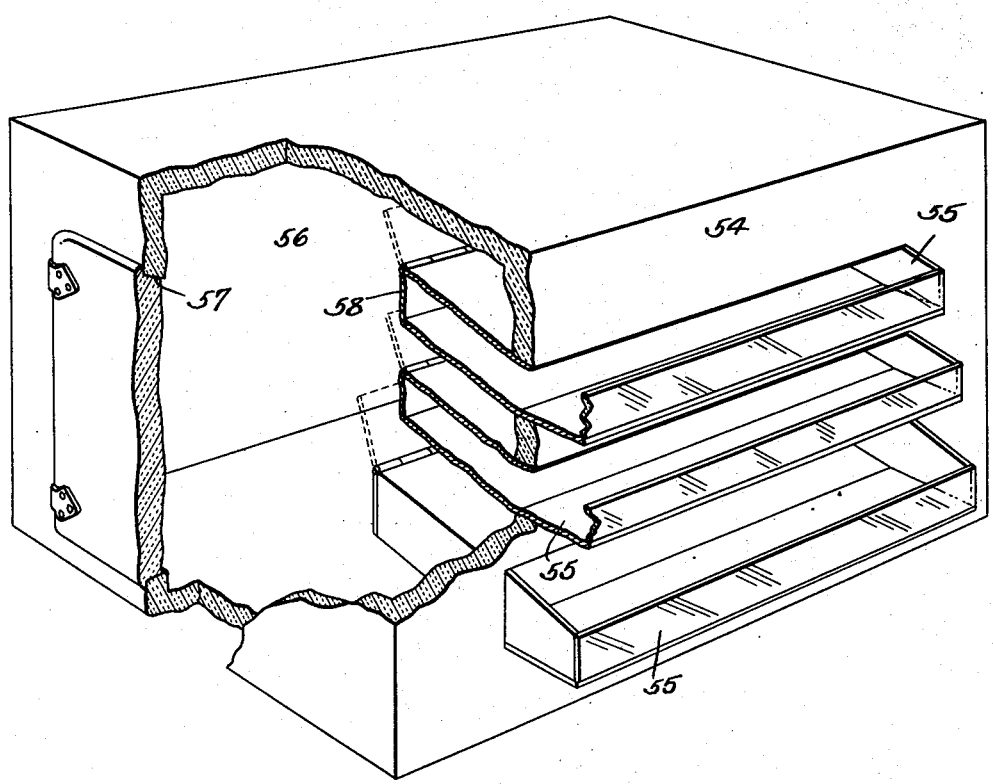
Figure 11 is a perspective view of a refrigerating apparatus of the step-in type, a portion being broken away.

The different forms of the apparatus thus far described have been in the nature of show cases which can be placed on the floor of a store wherever desired and will properly refrigerate foods, etc., while on display. It is to be understood, however, that the same principles of refrigerating foods can be embodied in apparatus of larger or step-in types. For example and as shown in Fig. 11, the front of a large refrigerating case 54 can be provided with superposed projecting trays or troughs 55 projecting forwardly from the front wall thereof. These troughs or trays can extend any desired distances forwardly beyond the case 54 and have the tops of the projecting portions open as shown. The trays or troughs are extended backwardly into the refrigerating compartment 56 in the case which is accessible through a normally closed door 57 and the inner or back end of each of these trays or troughs 55 is normally closed by a door 58. As the several trays or troughs are spaced apart, chilled air within the chamber 56 is free to circulate between and back of them so that by placing foods in the respective trays or troughs they will be maintained in a chilled condition and will be readily accessible from points outside of the case 54. It is of course to be understood that these trays or troughs must be filled from within the refrigerating chamber 56 and the bottoms of the trays or troughs can be inclined so as to facilitate outward feeding of the materials placed therein.

Figure 12:
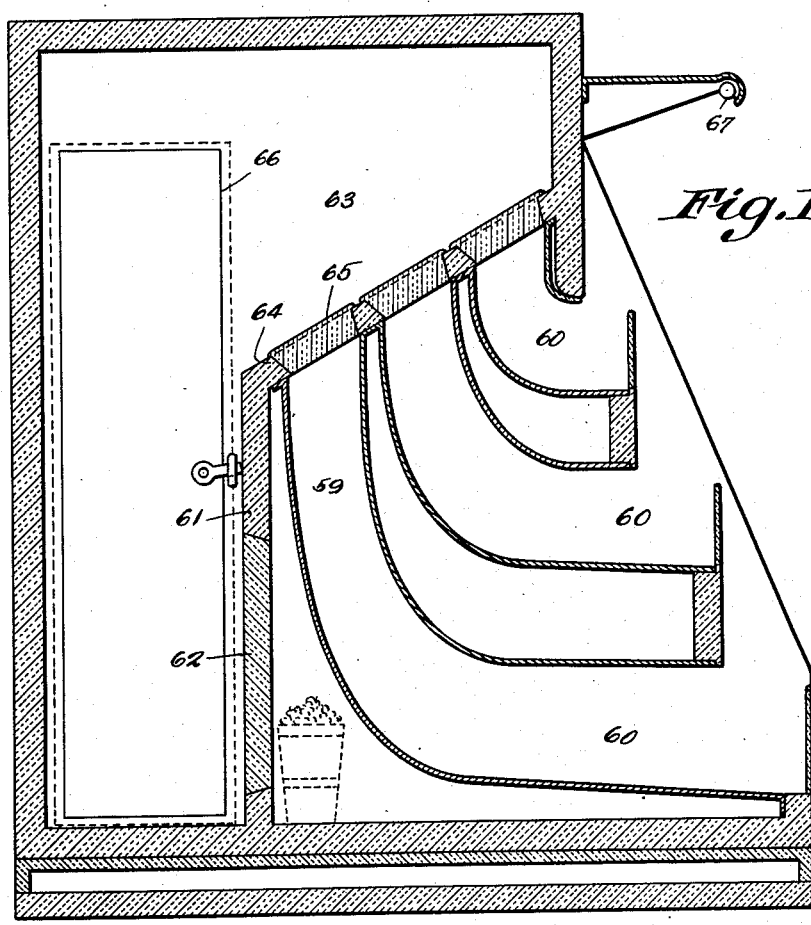
Figure 12 is a section through another form of refrigerator of the step-in type.
Figure 13:
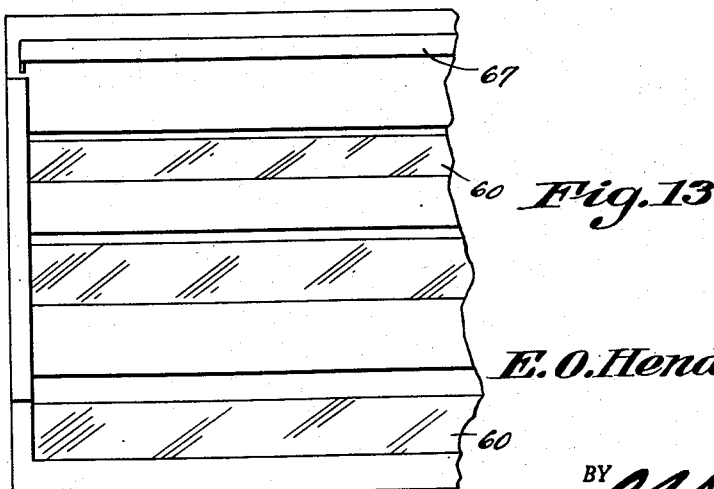
Figure 13 is a front elevation of a portion of the structure shown in Fig. 12.

Instead of feeding the trays or troughs at the backs thereof they can merge into upwardly extending chutes or dispensing containers 59, as shown in Figs. 12 and 13 wherein the superposed trays or troughs have been indicated at 60. In this modified structure a partition 61 having a door 62 can separate the refrigerating chamber 63 from that portion of the apparatus in which the containers and trays are located and the upper portion of this partition can be inclined upwardly and forwardly as at 64 so that the upper ends of the containers 59 can open therethrough. Closures 65 are provided in this inclined portion for the respective containers 59. The refrigerating chamber 63 has a normally closed door 66 through which access can be had and, by providing the door 62, the space in front of and below partition 61 in which the trays and containers are located can be used for storage purposes. In this modified structure illuminating means has been shown at 67 supported above the outlet ends of the trays or troughs 60. It will be noted that in all forms of this apparatus the dispensing tray or chamber is maintained constantly with a supply of merchandise which is fed thereto by gravity from within the chutes or containners, these chutes or containers being so located that all of the walls thereof are exposed to the chilling action of the refrigerant. Consequently the merchandise is kept cold in the chute and is supplied in the chilled condition to the dispensing chamber or tray.

What is claimed is:

1. Refrigerating apparatus including a case having a lower refrigerating compartment, trays mounted within the case so as to be normally closed off from but extending over the refrigerating compartment, said trays having open top portions exposed outside of the case, and dispensing containers overlying and discharging downwardly into the trays, each of said containers being so positioned in the case as to be normally closed off from but subject to the action of refrigerating means in the refrigerating compartment, each container being adapted at opposite ends thereof for passage of materials variable as to shape and bulk.

2. Refrigerating apparatus including a case having a lower refrigerating compartment, trays mounted within the case and extending over the refrigerating compartment, said trays having open top portions exposed outside of the case, and dispensing containers overlying the trays and opening at one end thereinto, said containers being so positioned within the case as to be subject to the chilling action of a refrigerating means in the refrigerating chamber, movable means for closing the other ends of the containers, said means comprising a reflecting element hingedly mounted on the case and normally overlying the trays.

3. A refrigerating apparatus including a case, superposed trays projecting therefrom, a refrigerating compartment constituting a substantial portion of the interior of the case, dispensing containers extending upwardly from the respective trays into the refrigerating compartment and having openings at their upper ends, the body and opposite ends of each container adapted for unimpeded passage therethrough of bulk materials and materials variable as to shape and size, means for closing said openings, all walls of the containers being positioned for chilling by a refrigerant in the refrigerating chamber.

4. Apparatus of the class described, comprising a case, an inclined dispensing container stationarily mounted therein, said container having an upper end proportioned to receive a relatively large quantity of merchandise variable as to shape and bulk, a dispensing tray communicating at one end with the other end of the container, the container and tray being proportioned for unimpeded passage therethrough by gravity of said merchandise moving in mass, and chilled-air-circulating refrigerating means mounted in the case separate from the container and tray, the walls of the container and tray being formed from a material readily conductive of thermal units, said container and tray being sealed against the admission thereinto of chilled air circulated by the refrigerating means.

ELDEN O. HENDERSON.

REFERENCES CITED

The following references are of record in the file of this patent:

UNITED STATES PATENTS

| Number | Name | Date |
| --- | --- | --- |
| 882,858 | Alexander | Mar. 24, 1908 |
| 923,132 | Bishop | June 1, 1909 |
| 951,323 | Mathewson | Mar. 8, 1910 |
| 1,446,381 | Dent | Feb. 20, 1923 |
| 1,619,999 | Wright | Mar. 8, 1927 |